United States Patent [19]

Houtman et al.

[11] Patent Number: 4,969,042
[45] Date of Patent: Nov. 6, 1990

[54] METHOD AND SYSTEM FOR TRANSMITTING IMAGE DATA

[76] Inventors: Frederik K. Houtman; Petra Houtman-Zuidema, both of Lijzijde 32, 9733 LB Groningen, Netherlands

[21] Appl. No.: 227,284

[22] Filed: Aug. 2, 1988

[30] Foreign Application Priority Data

Aug. 4, 1987 [NL] Netherlands ................. 8701838

[51] Int. Cl.⁵ .............................................. H04N 5/14
[52] U.S. Cl. ................................. 358/160; 358/903
[58] Field of Search ................ 358/105, 903, 160, 78, 358/136, 135, 86, 133, 106

[56] References Cited

U.S. PATENT DOCUMENTS

| | | | |
|---|---|---|---|
| 4,402,010 | 8/1983 | Vogelman | 358/903 X |
| 4,564,915 | 1/1986 | Evans et al. | 358/903 X |
| 4,733,303 | 3/1988 | Koshiishi | 358/400 |

Primary Examiner—Victor R. Kostak
Attorney, Agent, or Firm—Sprung Horn Kramer & Woods

[57] ABSTRACT

A method of, and a system for, transmitting and/or storing data in digitized form, in particular image data, between two telecommunication stations connected through a cable. The data is supplied, in a suitable form, to a computer and stored in at least a first memory section of the computer. A corresponding second memory section of the computer is defined, in which reference data is stored. Periodically and simultaneously both memory sections are scanned to compare the contents of corresponding memory locations. When a difference between the contents of corresponding memory locations of the two memory sections is detected, the contents of the memory location of the first memory section together with address data are transmitted and/or stored, and also written into the corresponding memory location of the second memory section to update the reference data.

15 Claims, 1 Drawing Sheet

METHOD AND SYSTEM FOR TRANSMITTING IMAGE DATA

BACKGROUND OF THE INVENTION

This invention relates to a method of transmitting and/or storing data in digitized form, suitable in particular for transmitting image data between two telecommunication stations connected through a cable; and also to a system for the application of the method.

In the past, many techniques have been developed for the transmission and/or storage of data. For the transmission of data, electrical lines can be used or telecommunication cables and beam transmitters if the data is to be transferred over large distances.

The data transmission is often effected in analog form, as is the case with telephone connections, but may also take place in digitized form, as is the case, for example, with data transmission by telex or within a computer system or a network of computers.

The transmission and/or storage of image data, such as, for example, television signals, presents particular problems, as involving huge amounts of data per unit of time, so that a transmission channel of very large capacity (bandwidth) and/or a memory of very large capacity is needed.

Thus, for example, it is not possible to transmit image data through a normal telephone line in a practicable manner, unless the images do not change, or hardly so. As a consequence, the design of videophone systems is not a problem technically, it is true, but the practical application of videophony is prevented because existing telephone connections have an insufficient transmission capacity.

SUMMARY OF THE INVENTION

It is an object of the present invention to provide a method and a system which make it possible to transmit image data in digitized form through existing telephone connections in a practicable manner and/or which make it possible to store image data in digitized form in a memory of limited capacity.

For this purpose, the present invention provides a method of the above kind which is characterized by supplying the data in a suitable form to a computer and storing it in at least a first memory section of the computer; defining a corresponding second memory section of the computer, in which reference data is stored; periodically and simultaneously scanning both memory sections to compare the content of corresponding memory locations; and, when a difference between the contents of corresponding memory locations of the two memory sections is detected, transmitting and/or storing the content of the memory location of the first memory section together with address data and also writing it into the corresponding memory location of the second memory section to update the reference data.

A system of the kind described is characterized, according to the present invention, by a computer having a first memory section for receiving and storing real-time data and a second memory section for reference data; a scanner and a comparator for periodically scanning the first and second memory sections and for comparing the contents thereof; and means for transmitting and/or storing the content of the first memory section as far as differing from the reference data.

The invention will be described in more detail hereinafter with reference to the accompanying diagrammatic drawings. In said drawings,

BRIEF DESCRIPTION OF THE DRAWINGS

FIG. 1 shows, in the form of a block diagram an example of a system according to the present invention for forming and processing image data, which system can be used as a transmission station, and/or can be connected to an image memory.

Figure 1:
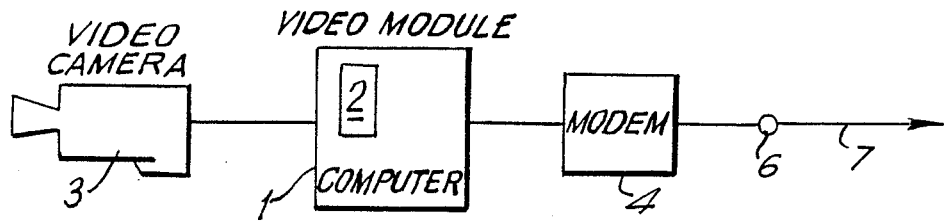
FIG. 1 shows the design of the transmission section of an image transmission system according to the present invention.

As shown, the system comprises a computer 1, which for example may be a simple, so-called "personal computer". The computer is provided with a video module 2, which is an A/D converter, and can receive video signal from a video camera 3, and convert these into digital signals that can be processed by the computer. Such video modules are known per se and commercially available for personal computers in the form of insertable cards, the so-called video cards.

The output signals from the computer 1 are supplied to a modem 4, also known per se, which has a buffer memory, in which the data provided by the computer is stored. The buffer memory is periodically scanned in known manner, and the data thus obtained is transmitted through a transmission channel 7 connected to the output 6 of the modem to, for example, a receiving station and/or stored in an image memory.

As stated before, the transmission and/or storage of image data in a practicable form requires a very high transmission and/or storage capacity.

This problem is overcome, in accordance with the present invention, by continually comparing the data to be processed at a given moment with the corresponding preceding data, and only then transmitting or storing data if it actually differs from the preceding data.

Furthermore, to further reduce the amount of data to be processed, the method and system are predicated upon pictures formed by a plurality of picture elements which may be fewer in number than is the case according to conventional television standards. Furthermore, the information to be provided by each picture element, i.e., brightness and colour, is represented by a limited number of bits of information. For this purpose, use can be made, with advantage, of a known per se evaluation system for picture element data according to which both the colour and the brightness of a picture element are defined by one binary number.

In a practical case, for example, each image field of frame may comprise $320 \times 200 = 64000$ picture elements or pixels, with the information content of each pixel being defined by seven bits.

In order to be able to determine which information should and which information should not be offered to the modem 4 for transmission and/or for storage, two memory sections, sometimes called tables, are defined in the memory of computer 1.

Figure 2:
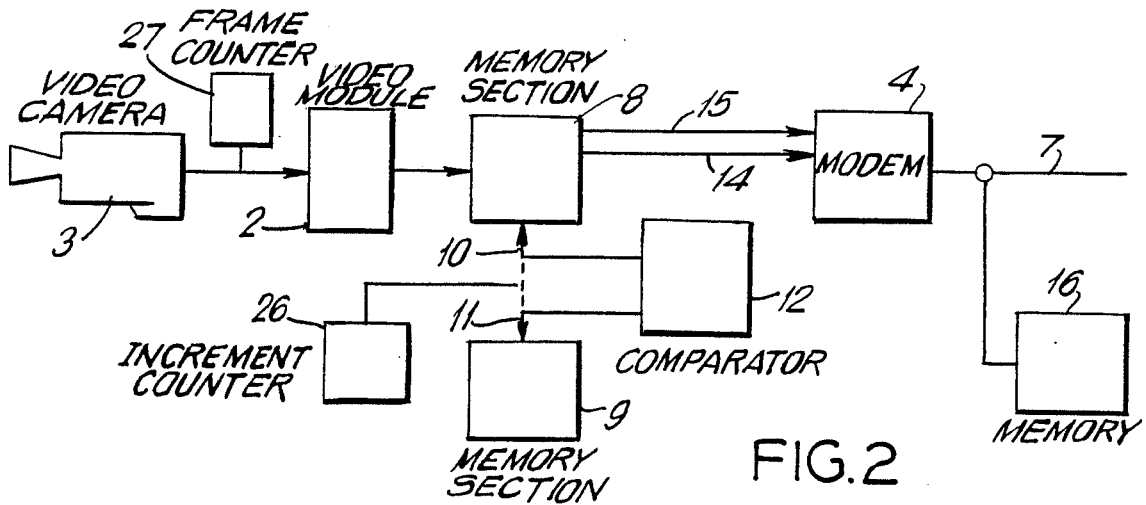
FIG. 2 shows the transmission section of FIG. 1 in more detail.

All this is shown diagrammatically in FIG. 2. In one memory section 8, the most recent information, provided by video module 2, is supplied. A second memory section 9 serves as a reference memory. The reference memory always contains the information just preceding the most recent information, that is to say, the information associated with the preceding image field or frame.

The memory sections 8 and 9 are arranged so that each memory comprises sufficient memory locations to receive the colour and brightness information associated with all pixels of one frame.

Accordingly, a frame of 320×200 pixels requires 64000 addresses, which each can contain sufficient bits, for example, 7 bits, for defining the colour and brightness information.

Each address is associated with a pixel having a pre-determined location.

The computer is programmed so that both memory sections are scanned simultaneously and in the same order. During this procedure, the information at a given address location of the memory section 8 is compared with the information at the corresponding address location of memory section 9. Scanning takes place by means of a suitable scanner, symbolized in FIG. 2 by means of arrows 10, 11, connected by a broken line.

For comparing the contents of the scanned memory locations, a comparator 12 is provided, which for example may be a subtractor.

As soon as comparator 12 detects a difference between the image information stored in two corresponding memory locations, the pixel information of the relevant memory location in memory section 8 is supplied to modem 4. This can be effected direct from memory section 8 under the control of the scanner, as indicated by a connection 14, or through comparator 12.

At the same time, the same information is written into the corresponding memory location of reference memory 9, so that the information in memory section 9 is continually updated.

In addition to the pixel information itself, information about the location of the pixel in the frame or information concerning the address of the memory location in which the pixel information was stored, should be supplied to the modem. All this is indicated symbolically in FIG. 2 by an arrow 15.

It is only the information about the changed pixels or the dynamic portion of the image information, and the associated information concerning the location of the changed pixel, that is transmitted by modem 4 through transmission channel 7 and/or stored in a suitable memory means 16.

It is noted that, at the beginning of a transmission cycle, reference memory 9 is still empty. By itself, this is not a great problem, because during the above-described scanning cycle, the reference memory is automatically filled with the information meanwhile stored in the real-time memory 8. The same information is then transmitted by the modem in total, i.e., without a reduction. As soon as the first image is present both in the reference memory 9 and at the receiving end and/or the memory means 16, it will subsequently suffice to transmit only the dynamic part of the information and the associated position data.

Naturally, it is also possible to supply the information concerning the first frame simultaneously to both memory sections 8 and 9 at the beginning of a transmission cycle, and also to offer it simultaneously to the modem for transmission and/or to the memory means 16.

According to the invention, use can be made, with advantage, of a pre-determined reference image which when a transmission cycle is initiated is automatically written into the reference memory. Preferably this is an image standardized and recorded for the station in question, which is also present in the memory of other, similar telecommunication stations. When a connection is initiated, this standard image can then be written into a reproduction buffer memory at the receiving end and reproduced on a monitor, until the transmitting station transmits new information.

Figure 3:
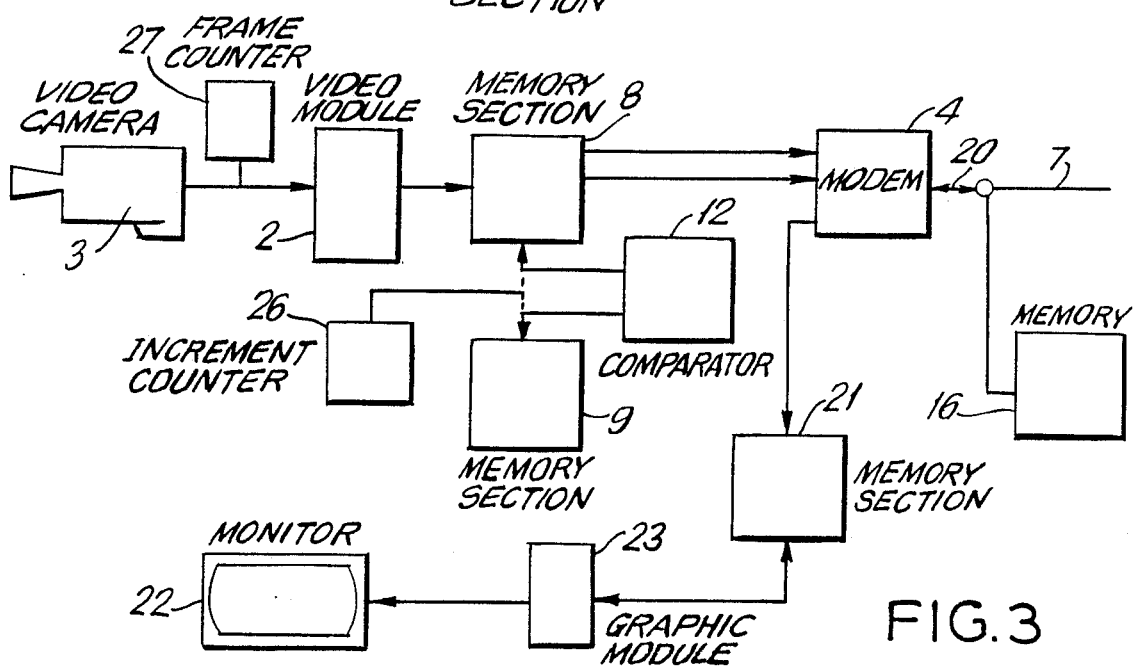
FIG. 3 shows the transmission section of FIG. 1 and FIG. 2, provided with receiving means.

FIGS. 1 and 2 only show the transmitting section of an image transfer system. FIG. 3 shows diagrammatically a complete transmitting/receiving station, which accordingly is suitable for bilateral communication, as is desirable in videophone systems.

It is noted, however, that a transmitting station as shown in FIG. 1 and FIG. 2 can be used in practice of its own right, for example, in remote monitoring systems or systems exclusively designed for image registration. Such remote monitoring systems can be used, for example, for safeguarding buildings or for watching spaces which are not accessible to people or with difficulty only, as to be found, for example, in the process industry or in space research.

In FIG. 3, it is symbolically indicated with a double arrow 20 that modem 4 can both supply information to transmission channel 7 (and/or memory means 16) and receive information from transmission channel 7 (and/or memory means 16).

The information received consists of colour and brightness information and address information indicating at what location in a memory section 21 the information offered at a given moment should be stored to replace the information stored in that memory location before.

The information stored at memory locations whose address does not occur in the signal received is maintained unaltered.

Each memory location of memory section 21 corresponds, in turn, with a pre-determined point of the picture frame. By periodically scanning the memory section in a pre-determined order, therefore, the signals needed for forming a picture on a monitor 22 can thus be retrieved. For this purpose, use can be made of a graphic module 23, which is commercially available for many personal computers as an insertable part (graphics card).

Preferably, in addition to memory section 21, which functions as a receiving memory, a buffer memory section is used too, which is periodically scanned to provide the signals needed for the monitor.

Figure 4:
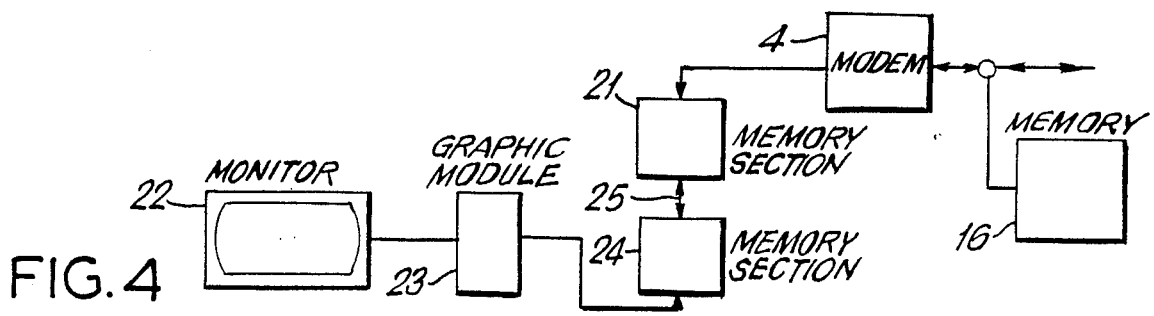
FIG. 4 shows a modification of FIG. 3.

All this is shown, for the sake of completeness, in FIG. 4, which only shows the receiving section of a transmitting/receiving station. The changing picture information is supplied through modem 4 to memory section 21 and written at the correct memory locations. The memory section is periodically scanned by means of a suitable scanner, as indicated symbolically by the double arrow 25, and the information present in memory section 21 is thereby transferred to a reproduction buffer memory section 24, which in turn is scanned periodically in the manner described to provide the signals needed for the monitor.

Advantageously, when making the connection, a reference image associated with the other station can directly be written into the memory section 21 from the computer memory, if at least the computer memory contains the reference image of the other station. If this is not the case, the first image is transferred in the normal way, when information is written into each memory location of memory section 21.

When the connection between two stations is established, the stations are adjusted to each other, that is to say, information is exchanged between the two stations, indicating how many pixels a picture frame has, how many colour/brightness levels a pixel may have, whether a station reference picture is available, and whether the scanners 10, 11 and 25 are indeed at the initial addresses of the associated memory sections.

The above information may be stored in a single check block, i.e., a binary signal of, for example, 8 bits wide. Accordingly, adjustment takes place by transmitting the check block and processing it at the receiving end. As, during this procedure, the scanners are also set at corresponding initial addresses, there is at the same time a form of synchronization between the two stations.

As each memory location of a memory section corresponds with a pre-determined pixel and further the memory sections in all stations are scanned in the same order, further synchronization between the stations is unnecessary. The required synchronization actually takes place internally. Therefore, no frame synchronization signals and line synchronization signals need to be transmitted. In this way a considerable reduction of the required capacity of the transmission channel is achieved.

As stated before, the information to be transmitted consists of address information and pixel information.

The procedure is preferably as follows. When the pixel information in two corresponding memory locations of memory sections 8 and 9 is identical, an increment counter 26 coupled to scanner 10, 11 is increased by 1. When the memory locations of memory sections 8 and 9 subsequently scanned again contain identical information, the increment counter is again increased by 1. This process is repeated until the corresponding memory locations of memory sections 8 and 9 are found to contain different pixel information. At that moment, first the position of the increment counter 26 is transmitted and subsequently the real-time pixel information is transmitted, which is stored in memory section 8 at the scanned address location. At the receiving end, the new (changed) pixel information is then stored at an address location removed as many scanning steps from the previous address location of memory section 21 in which received information is stored as the content of the increment counter. At the same time, the increment counter at the transmitting end is reset, i.e., put in the zero position. Furthermore, at the transmitting end, the real-time pixel information is also written into the relevant memory location of memory section 9. Subsequently, at the transmitting end, the pixel information in the next corresponding address location of memory sections 8 and 9 is compared. When this information is again different, the real-time information is transmitted and also written into memory section 9. The increment counter is then not increased and remains in the zero position.

It will be seen from the foregoing that the address information to be transmitted is not the actual address, but the number of scanning steps which the scanner 10, 11 has made since the last time different information was detected at corresponding address locations in memory sections 8 and 9.

Accordingly, the information to be transmitted consists of a pixel information block, which may or may not be preceded by an increment block representing the counter position of the increment counter.

In order that these blocks may be distinguished from each other at the receiving end, use can be made, with advantage, of an identification bit situated at a predetermined location in the blocks. The identification bit may, for example, be "1" in the case of an increment block and "0" in the case of a pixel information block.

Furthermore, preferably a frame counter 27 is provided for both the transmitting section and the receiving section, which frame counter is coupled with the scanner and, at the beginning of the scanning, has a content corresponding with the pre-determined number of pixels per frame, for example, $320 \times 200 = 64000$. This counter counts in synchronism with the scanning and thus, by reaching the zero position, indicates that all pixels of a complete frame, at least the memory locations associated with these, have been scanned.

The reaching of the zero position of the picture frame counter can also be used to limit the capacity required for the increment counter 26. In fact, if the picture picked up by camera 3 is not changed for some time, the content of the increment counter could run up very high. This can be prevented, for example, by resetting the increment counter to zero when the picture frame counter reaches the zero position, and arranging for the scanning of memory section 21, and possibly memory section 24, to jump to the initial address at the receiving end. This can be accomplished by a separate signal, but it is also possible to transmit an information block associated with the last pixel of the picture frame, or the next first pixel, whereby the increment counter is automatically re-set to zero.

In the foregoing, it has been assumed that the two stations are capable of processing picture frames with the same resolution, that is to say, the same number of pixels, and that each pixel can be represented by the same number of bits. However, this need not necessarily be the case. One station may, for example, have a frame of $320 \times 200$ points, and the other a frame of, for example $160 \times 100$ pixels.

Adaptation is then required at the station with the higher resolution, which takes place after the receipt of the check block, which contains the relevant information. Adaptation can be effected in video module 2, but also means that the capacity of memory sections 8, 9, 21, 24 to be defined can be halved, and the initial position of the frame counter adapted.

It is noted that, after reading the foregoing, various modifications will readily occur to those skilled in the art. Thus, the invention can be used for transmitting and/or storing all information which can be offered to a computer in digitized form in one way or another. One example is the storage of text in a suitable memory means, for example, a disc of the "compact disc" type.

Naturally, when applied for video telephony, as indicated hereinbefore, sound should be transmitted as well. For this purpose a separate line, for example, an additional normal telephone connection can be used. It is also possible to use the same line, if a known per se priority system is built in, which can recognize audio signals and transmit these while suppressing the other signals. Monitor 22 then temporarily shows the "old" image information which has not yet been updated.

Such modifications are considered to fall within the scope of the invention.

We claim:

1. In a method of transmitting and/or storing data in digitized form, suitable in particular for transmitting image data between two telecommunication stations connected through a cable, the improvement which comprises supplying the data in a suitable form to a computer and storing it in at least a first memory section of the computer; defining a corresponding second memory section of the counter, in which reference data is stored; periodically and simultaneously scanning both memory sections to compare the contents of corresponding memory locations; and when a difference between the contents of corresponding memory locations of the two memory sections is detected, transmitting and/or storing the content of the memory location of the first memory section together with address data and also writing it into the corresponding memory location of the second memory section to update the reference data, wherein the address data is obtained by increasing the position of an increment counter by 1 each time when memory locations of the memory sections are compared and have an identical content, and transmitting and/or storing the position of the increment counter when memory locations of the first and second memory sections are compared and have different contents.

2. A method as claimed in claim 1, wherein when the compared corresponding memory locations of the first and second memory sections have different contents, first an increment signal representing the position of the increment counter, and next a data signal representing the content of the relevant memory location of the first memory section are transmitted and/or stored.

3. A method as claimed in claim 2, wherein the increment signal and the data signal are each provided with an identification bit which has a different value for the two signals.

4. A method as claimed in claim 1, further comprising a third memory section for receiving a transmitted signal, said third memory section having memory locations corresponding with the memory locations in the first and second memory sections, and storing received data signals in the third memory section at a location corresponding to that of the corresponding location of the first memory section at the transmitting end, in which a content has been detected which differs from the content of the corresponding location in the second memory section.

5. A method as claimed in claim 4, wherein the content of the third memory section is periodically written into a fourth memory section, which serves as a reproduction buffer and is periodically scanned to provide signals required for reproducing an image corresponding to the image data.

6. In a method of transmitting and/or storing data in digitized form, suitable in particular for transmitting image data between two telecommunication stations connected through a cable, the improvement which comprises supplying the data in a suitable form to a computer and storing it in at least a first memory section of the computer; defining a corresponding second memory section of the computer, in which reference data is stored; periodically and simultaneously scanning both memory sections to compare the contents of corresponding memory locations; and when a difference between the contents of corresponding memory locations of the two memory sections is detected, transmitting and/or storing the content of the memory location of the first memory section together with address data and also writing it into the corresponding memory location of the second memory section to update the reference data, wherein, the reference data corresponding to a predetermined initial image independent of the image to be transmitted and/or stored is stored in the second memory section prior to the periodical scanning.

7. A system for transmitting and/or storing data in digitized form, in particular suitable for transmitting image data between two telecommunication stations connected through a cable, comprising a computer having a firs memory section for receiving and storing real-time data and a second memory section for reference data; a scanner and a comparator for periodically scanning the first and second memory sections and for comparing their contents; means for transmitting and/or storing the content of the first memory section when the content of the first memory section differs from the reference data; and means for generating the reference data corresponding to a predetermined initial image independent of the image to be transmitted and/or stored at the beginning of the transmission and/or storage of data.

8. A system as claimed in claim 7, further comprising means which, under the control of the comparator and the scanner, replaces the reference data in the second memory section by the real-time data of the first memory section during the scanning thereof, when it differs from the reference data.

9. A system as claimed in claim 7, further comprising a video camera and a computer provided with a video module, which computer digitizes the signals from the video camera and supplies the digitized data to the first memory section.

10. A system as claimed in claim 9, further comprising a graphic module in said computer, which module is coupled with a monitor.

11. A system as claimed in claim 9, further comprising a modem for receiving the data to be transmitted from the computer and supplying it to a transmission channel, and for receiving data from the transmission channel and/or a memory means, and supplying it to a receiving memory section of the computer.

12. A system for transmitting and/or storing data in digitized form, in particular suitable for transmitting image data between two telecommunication stations connected through a cable, comprising a computer having a first memory section for receiving and storing real-time data and a second memory section for reference data; a scanner and a comparator for periodically scanning the first and second memory sections and for comparing their contents; means for transmitting and/or storing the content of the first memory section when the content of the first memory section differs from the reference data; and, at least a third memory section coupled with receiving means and capable of receiving transmitted data and means for generating the reference data corresponding to a predetermined initial image independent of the image to be transmitted and/or stored at the beginning of a receiving cycle and writing it into the third memory section.

13. A system as claimed in claim 12 further comprising a fourth memory section which forms a reproduction buffer and periodically receives the data from the third memory section and is itself periodically scanned to provide the signals required for reproduction of an image corresponding to the image data.

14. A system for transmitting and/or storing data in digitized form, in particular suitable for transmitting image data between two telecommunication stations connected through a cable, comprising a computer having a first memory section for receiving and storing real-time data and a second memory section for reference data; a scanner and a comparator for periodically scanning the first and second memory sections and for comparing their contents; means for transmitting and-/or storing the content of the first memory section when the content of the first memory section differs from the reference data; means coupled with the scanner for providing the content of the first memory section to be transmitted and/or to be stored with address data and wherein the means forming the address data comprises an increment counter, the content of which is increased by 1 each time the contents of periodically compared successive memory locations of the first and second memory sections are identical, and the position of which is transmitted and/or stored when memory locations of the first and second memory sections not having the same content are addressed by the scanner, whereafter the increment counter is re-set to zero.

15. A system for transmitting and/or storing data in digitized form, in particular suitable for transmitting image data between two telecommunication stations connected through a cable, comprising a computer having a first memory section for receiving and storing real-time data and a second memory section for reference data; a scanner and a comparator for periodically scanning the first and second memory sections and for comparing their contents; means for transmitting and-/or storing the content of the first memory section when the content of the first memory section differs from the reference data; and at least one image counter counting down from a position corresponding to a number of pixels in an image during the scanning of at least the first and second memory sections.

* * * * *